United States Patent [19]

Behr

[11] 4,256,858
[45] Mar. 17, 1981

[54] PROCESS FOR CROSS-LINKING POLYMERS CONTAINING ACTIVE HALOGEN

[75] Inventor: Sigurd Behr, Monheim, Fed. Rep. of Germany

[73] Assignee: Bayer Aktiengesellschaft, Fed. Rep. of Germany

[21] Appl. No.: 60,831

[22] Filed: Jul. 25, 1979

[30] Foreign Application Priority Data

Jul. 27, 1978 [DE] Fed. Rep. of Germany ....... 2832910

[51] Int. Cl.³ ................................................ C08F 8/30
[52] U.S. Cl. ................................... 525/375; 525/330; 525/349
[58] Field of Search .............................. 525/375, 349

[56] References Cited

U.S. PATENT DOCUMENTS

| | | | |
|---|---|---|---|
| 3,335,124 | 8/1967 | Larsen | 525/375 |
| 3,379,707 | 4/1968 | Lund et al. | 525/375 |
| 3,686,154 | 8/1972 | Khaa | 525/375 |
| 3,844,985 | 10/1974 | Fukutani et al. | 525/375 |
| 3,872,128 | 3/1975 | Byck | 525/375 |
| 3,919,143 | 11/1975 | Morris | 525/375 |

FOREIGN PATENT DOCUMENTS

| | | | |
|---|---|---|---|
| 703198 | 2/1965 | Canada | 525/375 |
| 1310524 | 7/1961 | France | 525/375 |

Primary Examiner—William F. Hamrock
Attorney, Agent, or Firm—Connolly and Hutz

[57] ABSTRACT

Process for cross-linking polymers which contain an active halogen by using a compound of the formulae:

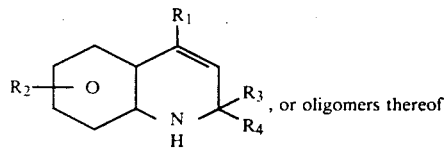

, or oligomers thereof (1)

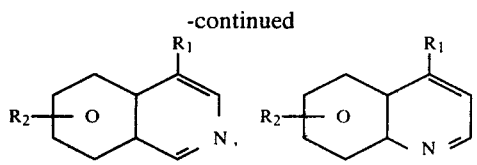

(2)          (2 a)

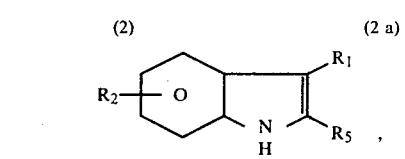

(3)

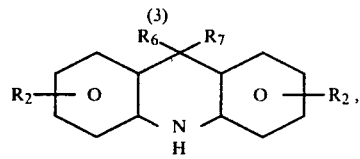

(4)

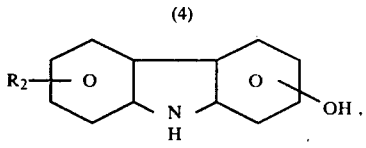

(5)

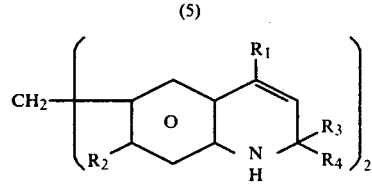

(6)

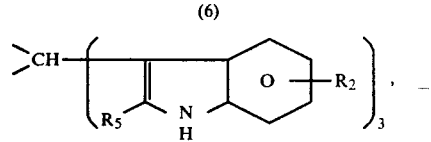

(7)

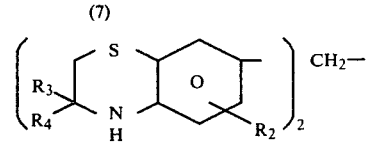

(8)

as a cross-linking agent.

6 Claims, No Drawings

PROCESS FOR CROSS-LINKING POLYMERS CONTAINING ACTIVE HALOGEN

This invention relates to a process for cross-linking polymers containing active halogen using certain products which make the polymers safer to process and which do not bring about an increase in the vulcanisation time.

Conventional cross-linking agents, for example for polychloroprene, are attended by the disadvantage that, on completion of the main reaction, cross-linking continues at a reduced velocity. This is reflected in the corresponding Vulkameter curves. It is no longer possible to speak in terms of post-cross-linking when, on completion of the main cross-linking reaction, the Vulkameter curve runs parallel to the time axis. If, however, the curve continues to climb, this is indicative of post-cross-linking. The difference in time between 90% and 80% vulcanisation ($T_{90}$-$T_{80}$) may be regarded as a measure of post-cross-linking. If this difference is small, only minimal post-cross-linking occurs.

Technologically, post-cross-linking means that vulcanisates of large volume do not show a uniform degree of cross-linking or modulus over the cross-section thereof. This has an adverse effect inter alia in the event of dynamic stressing.

In addition, conventional cross-linking agents for polychloroprene bring about a cross-linking reaction which begins quickly, but continues slowly. This may also be seen from the Vulkameter curves. The incubation time (the time required to reach 10% vulcanisation) is short, whilst the cure time (the time required to reach 80% vulcanisation) is long, in other words the rise of the Vulkameter curve begins early and is relatively flat. In such a cross-linking reaction, the quotient $T_{10}/T_{80}$ is small. Technologically, this is equivalent to a minimal level of safety in processing.

It has now been found that, where certain products are used, cross-linking is virtually completed with the main reaction and, with continued application of heat, no cross-linking occurs. It has also been found that the quotient $T_{10}/T_{80}$ is considerably greater than, for example, where the conventional cross-linking agent, thiourea, is used. In addition the incubation time ($T_{10}$) is surprisingly longer. It has also been found that the compounds used in accordance with the present invention provide for improved behaviour under dynamic flexural stressing by comparison with cross-linking carried out using thiourea.

Accordingly, the present invention relates to a process for cross-linking polymers containing active halogen which is characterised in that the cross-linking agents used are compounds corresponding to the following general formulae:

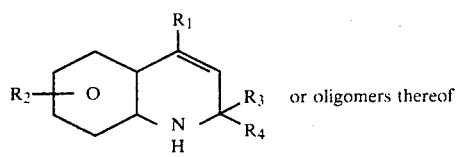 (1) or oligomers thereof

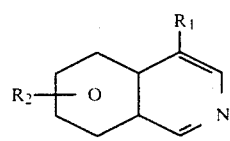 (2)

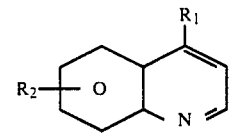 (2a)

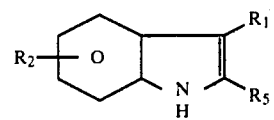 (3)

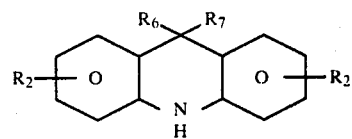 (4)

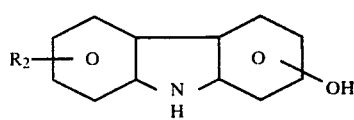 (5)

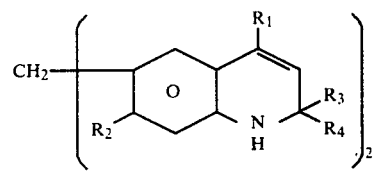 (6)

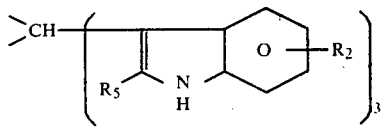 (7)

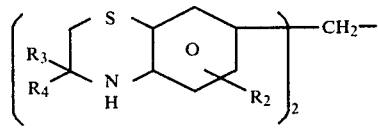 (8)

wherein
$R_1$ represents hydrogen or, $C_1$–$C_4$ alkyl;
$R_2$ represents hydrogen, $C_1$–$C_{14}$ alkyl, $C_1$–$C_{14}$ alkoxy, $C_1$–$C_{14}$ alkyl phenyl, phenyl, naphthyl, hydroxyl or, $C_1$–$C_{14}$ alkyl hydroxyl;
$R_3$ and $R_4$, which may be the same or different, each represents hydrogen or, $C_1$–$C_4$ alkyl;
$R_5$ represents hydrogen or, $C_1$–$C_4$ alkyl; and
$R_6$ and $R_7$, which may be the same or different, each represents hydrogen or $C_1$–$C_4$ alkyl;
and in that cross-linking is carried out in the conventional way.

In the above general formulae, $R_2$ preferably represents hydrogen, $C_1$–$C_{14}$ alkyl, $C_1$–$C_4$ alkoxy and phenyl.

Particularly preferred compounds are: isoquinoline, 9H-carbazol-2-ol, dimethyl acridane, quinoline and its 4- and 6-methyl derivatives, 1H-indole and its 2-methyl and 2,3,5-trimethyl derivatives, 2,2,4-trimethyl-1,2-dihydro-quinoline and its 5-,6-,7- or 8-methyl derivatives, its 6-ethoxy or 6-dodecyl or 6-phenyl derivatives, a compound corresponding to general formula (6) wherein $R_1$, $R_3$ and $R_4$ each represents hydrogen or methyl and $R_2$ represents hydrogen, a compound corresponding to general formula (7) wherein $R_2$ and $R_5$ each represents hydrogen and a compound corresponding to general formula (8) wherein $R_2$, $R_3$ and $R_4$ each represents hydrogen. Other preferred compounds are the oligomers (degree of oligomerisation from 2 to 15) of the above-mentioned 1,2-dihydroquinoline.

Particularly suitable compounds are 2,2,4-trimethyl-1,2-dihydroquinoline or oligomers thereof, 6-methyl-,6-ethoxy-,6-dodecyl-or 6-phenyl-2,2,4-trimethyl-1,2-dihydroquinoline or oligomers thereof. (2,2,4-trimethyl-1,2-dihydroquinoline is referred to herein as TMDHCH.)

The compounds are known from the literature.

In the case of TMDHCH, for example, it was found that the level of reactivity during the cross-linking reaction is dependent upon the degree of oligomerisation (cf. Example 15). Accordingly, the cross-linking reaction may be controlled by selecting the degree of oligomerisation or by simultaneously using different degrees of oligomerisation.

Preferred polymers containing active halogen are halogen-containing diene rubbers, such as chlorinated polyisoprene, chlorinated or brominated natural rubber, chlorobutyl and bromobutyl rubber and also most preferably polychloroprene. These polymers are distinguished by the fact that they contain a reactive halogen atom.

Polymers of chloroprene unmodified or modified with sulphur, or mixtures thereof, may be used as the polychloroprene. In addition, it is possible to use copolymers which contain up to 50% of a compound copolymerisable with chloroprene, such as monovinyl compounds (acrylonitrile, methacrylonitrile, vinylidene chloride, α-chloroacrylonitrile, methacrylic acid esters and acrylic acid esters), vinyl-substituted aromatic compounds (styrene and vinyl toluenes) and conjugated diene compounds (1,3-butadiene,1-chloro-1,3-butadiene, 2,3-dichloro-1,3-butadiene, and 2-chloro-3-methyl-1,3-butadiene).

Where compounds corresponding to the above general formulae, preferably TMDHCH and, better still, in oligomeric form having a melting point of approximately 70° C., are used, it has been found that, on the one hand, technically useful cross-linking, preferably in the case of polychloroprene, is obtained at room temperature (RT) or at a slightly elevated temperature whilst, on the other hand, the mixtures show a degree of safety in processing which, in the case of conventional polychloroprene accelerator systems, is only achieved by dispensing with self-vulcanisation. In addition, despite a long incubation time, there is no increase in the vulcanisation time at room temperature and slightly elevated temperature (cf. Example 9).

This enables rubber articles to be produced by processes which would otherwise have been unworkable. In many cases, this method of cross-linking at room temperature or a slightly elevated temperature eliminates the need for expensive, energy-consuming vulcanisation apparatus. Such vulcanisation apparatus is essentially required not only for supplying energy, but also for applying an external pressure to eliminate porosity in the vulcanisate.

There is no need for particular formulation-related measures, such as the addition of water binding agents, which in turn adversely affect the properties of the vulcanisates, because cross-linking at room temperature and at slightly elevated temperatures remains well below the boiling point of water. Similarly, there is frequently no need to use a vacuum extruder because at room temperature and at slightly elevated temperatures other readily volatile constituents of the mixture do not give rise to pore formation.

Vulcanisation apparatus may be utilised much more effectively insofar as it is only a shaping or forming pre-cross-linking reaction which is allowed to take place and further cross-linking is carried out at room temperature or a slightly elevated temperature by self-vulcanisation using the new cross-linking system (Examples 10, 11 and 12).

The compounds used according to the present invention, preferably the oligomeric TMDHCH, may also be used for cross-linking adhesive films, preferably based on polychloroprene. In this case, it has surprisingly been found that, despite the addition of the so-called "cross-linking agent" which, hitherto, has generally been an isocyanate, the so-called "pot life" is very considerably increased or is unaffected. Those skilled in the art know that, with isocyanates, pot life only amounts to a few hours. According to the present invention, there was no change in the viscosity of the polychloroprene adhesive solution after 20 days (Example 13).

It may be concluded from this that no cross-linking reaction takes place as long as solvents are present.

The new cross-linking systems may also be used in the latex field. Thus, it has been found that preferably TMDHCH (melting point approximately 70° C.) cross-links a cast polychloroprene latex film both at normal vulcanisation temperatures and also at room temperature and at slightly elevated temperatures (cf. Example 14).

Accordingly, the compounds act in the same way as in a solid rubber once the polymer of the latex has precipitated.

The cross-linking reaction also takes place with pure polymer, i.e. there is generally no need for metal oxides (cf. Example 16). Thus, given suitable stabilisation, the well known disadvantage of metal oxides may be avoided, for example in the polychloroprene mixtures.

It has been found that, using TMDHCH (melting point approximately 70° C.), cross-linking reactions take place at room temperature and at slightly elevated temperatures, for example, not only on polychloroprene-mercaptan types, but also on polychloroprene-thiuram types (=sulphur-modified types), cf. Example 17.

This reaction mechanism which, accordingly, also takes place in the case of thiuram types and the dependence upon the degree of oligomerisation may be utilised for largely solving a problem familiar to those skilled in the art, namely the problem of storing sulphur-modified polychloroprenes.

It is well known that the viscosity of the crude polymer (for example Mooney viscosity at 100° C.) is not as stable as that of polychloroprene-mercaptan types, for example. By adding small quantities of monomeric TMDHCH or small quantities of 6-ethocy-TMDHCH, the degredation reaction which normally continues during storage of the sulphur-modified polychloroprene may be arrested or suppressed by controlled pre-cross-linking. This improves the stability of viscosity during storage of the crude polymer (cf. Example 18).

Another surprising feature of this new cross-linking method, preferably using TMDHCH (melting point approximately 70° C.), is that, where the optimal dosage of from 1.5 to 2.5 phr is used, the cross-linking reaction comes to an end and, in the event of so-called "over-vulcanisation", there is virtually no further cross-linking, as is the case where conventional cross-linking systems are used. This is apparent from the trend of the Vulkameter curve, which, on completion of the main cross-linking reaction, runs substantially parallel to the time axis. In some cases, a slight maximum of the shear modulus is even observed. This means that the difference between $T_{90}$ and $T_{80}$ (time for 90% and 80% vulcanisation) is very small (cf. Example 19).

Technologically, this property is of importance insofar as, where articles of large volume are vulcanised at the conventional vulcanisation temperatures, the outer lays have the same degree of cross-linking as the middle of the vulcanisate which, as any skilled in the art know, improves the dynamic behaviour of the article.

It has been found that the new cross-linking reaction, preferably using TMDHCH (melting point approximately 70° C.), may even be used in combination with conventional accelerators/cross-linking agents, including sulphur and sulphur donors. Despite the fact that the cross-linking velocity and the degree of cross-linking at normal vulcanisation temperatures are influenced, the property of cross-linking at room temperature and at slightly elevated temperatures surprisingly remains intact (cf. Examples 20, 21, 22).

Another feature of this new cross-linking process is that, by comparison with the thioureas generally used hitherto, dynamic crack formation and crack growth behaviour is considerably improved (cf. Example 19).

The cross-linking agents used in accordance with the present invention may be added in quantities familiar to those skilled in the art for cross-linking the polymers containing active halogen.

Quantities of from 0.1 to 15 parts, by weight, per 100 parts by weight, of solid rubber are preferably used for cross-linking, quantities of from 0.3 to 3 parts, by weight, being particularly preferred.

For stabilising the viscosity of and for pre-cross-linking sulphur-modified and nonsulphur-modified polychloroprenes, it is preferred to use quantities of from 0.01 to 1.0 part, by weight, per 100 parts, by weight, of solid rubber.

The compounds used according to the present invention may be used either on their own or even in combination with conventional cross-linking agents and accelerators, particularly thiourea, thiuram/amine, sulphur/thiuram/guanidine, thiazolidine thione, thiadiazine and triazine.

The cross-linking temperature is known to those skilled in the art and is governed by the particular cross-linking process used. Cross-linking is preferably carried out at temperatures between room temperature (i.e. up to about +5° C., depending on climatic and seasonal conditions) and up to +270° C. and, with particular preference, at temperatures of from +40° C. to +200° C.

Examples of suitable vulcanisation processes are press heating, hot-air heating, superheated-steam heating, injection and transfer vulcanisation processes, continuous processes carried out in superheated steam, hot air, infrared heat, hot air/microwaves, salt baths, fluid beds, so-called "Auma" processes for films, rubberised fabrics, sheets, V-belts and drive belts, also lead-jacket processes. The cross-linking agents may also be used at room temperature in the absence of external pressure for a so-called "self-vulcanisation" process.

Combinations of processes may also be used. Thus, pre-cross-linking may be carried out at room temperature or a slightly elevated temperature, followed by further cross-linking at elevated temperature, final cross-linking again being possible at room temperature or a slightly elevated temperature.

Conversely, however, pre-cross-linking may even be carried out at elevated temperature to such a minimal extent that the pre-cross-linked material may still be rolled, i.e. re-used. Final cross-linking may then be carried out in the absence of pressure at room temperature or at slightly elevated temperatures.

Further mixture constituents which may be added to the polymers cross-linkable by the present process, preferably the polychloroprene and the chlorobutyl and bromobutyl rubber, are the conventional constituents normally encountered in the solid rubber, latex and adhesive field, for example, metal oxides, such as zinc oxide, magnesium oxide, calcium oxide or lead oxides, active and inactive carbon blacks and also light fillers, such as silicas, kaolins (cf. Example 23) and chalks, siliceous chalks, plasticisers, antiagers and anti-ozonants, expanding agents and processing aids, such as factice, stearic acid, polyethylene wax, parrafins, resins and vaseline.

Other known polymers may also be added to the polymers cross-linkable by this process, as known to those skilled in the art. Examples of such polymers are NR, IR, SBR, BR, EPM, EPDM, NBR, PVC, styrene, EVAC, CM. PE and PP.

EXAMPLE 1

Production of a polychloroprene mixture is known manner in accordance with the following formulation on mixing rolls:

| | | | | |
|---|---|---|---|---|
| Polychloroprene (unmodified with sulphur) | 100 | 100 | 100 | 100 |
| Stearic acid | 0.5 | 0.5 | 0.5 | 0.5 |
| MgO | 4 | 4 | 4 | 4 |
| Alkylated diphenyl amine | 2 | 2 | 2 | 2 |
| Carbon black N762 | 30 | 30 | 30 | 30 |
| Zinc oxide, active | 5 | 5 | 5 | 5 |
| TMDHCH (Mp. approximately 70° C.) | 2 | — | — | — |
| TMDHCH (liquid) | — | 2 | — | — |
| Ethylene thiourea | — | — | 0.5 | — |
| Tetramethyl thiuram monosulphide | — | — | — | 1 |
| Diorthotolyl guanidine | — | — | — | 1 |
| Sulphur | — | — | — | 0.5 |
| Mooney scorch time 120° C. (mins.) | 11 | 28 | 11 | >45 |
| Vulkameter 150° C. (running time 40') (*) | | | | |
| $T_{10}$(mins.) | 4.5 | 6.5 | 3.5 | 10.5 |
| $T_{50}$(mins.) | 9 | 11 | 8.5 | 15 |
| $T_{80}$(mins.) | 12 | 14 | 16 | 20 |
| $T_{90}$(mins.) | 14 | 15 | 21 | 24 |
| Maximum shear modulus (N) | 32 | 22 | 27 | 25 |
| Vulkameter 170° C. (running time 40') | | | | |
| $T_{10}$(mins.) | 2.2 | 2.9 | 1.8 | 4.0 |
| $T_{50}$(mins.) | 3.9 | 5.0 | 3.7 | 5.6 |
| $T_{80}$(mins.) | 5.3 | 6.7 | 6.7 | 8.1 |
| $T_{90}$(mins.) | 6.0 | 16,7 | 10.7 | 11.8 |
| Maximum shear modulus (N) | 34 | 26 | 29 | 28 |
| Basic vulcanisate values (150° C.), average values of heating for 20', 30' and 40' | | | | |
| Tensile strength (MPa) | 17.8 | 19.3 | 19.2 | 19.5 |
| Elongation at break (%) | 445 | 635 | 475 | 640 |
| Modulus at 300% elongation (MPa) | 9.5 | 5.9 | 9.0 | 6.2 |
| H (Shore A) | 61 | 55 | 62 | 56 |
| Resilience (%) | 46 | 44 | 49 | 46 |
| Hot-air ageing at 100° C. after 7 days | | | | |

-continued

| | | | | |
|---|---|---|---|---|
| D/Do.100(%) 150° C./30' | 84 | 94 | 96 | 77 |
| 45' | 85 | 88 | 99 | 80 |
| Change in hardness (Shore A) | | | | |
| 150° C./30' | +10 | +14 | +1 | +7 |
| 45' | +9 | +13 | +2 | +7 |
| Compression set 150° C./45' | | | | |
| 22h/70° C. (%) | 9 | 17 | 8 | 11 |
| 70h/100° C. (%) | 34 | 37 | 25 | 64 |

(*) Note:
The running times of 40 and 20 minutes mentioned here and in the following Examples represent the reference value for determining the Vulkameter data

EXAMPLE 2

Derivatives of TMDHCH as cross-linking agents for polychloroprene:
2,2,4-trimethyl-1,2-dihydro-6-ethoxy quinoline = I
2,2,4-trimethyl-1,2-dihydro-6-phenyl quinoline = II
2,2,4-trimethyl-1,2-dihydro-6-dodecyl quinoline = III
5,5'-dimethyl acridane = IV
Production of mixture in known manner (the comparison cross-linking system is a conventional sulphur/guanidine/thiuram system).

| | A | B | C | D | E |
|---|---|---|---|---|---|
| Polychloroprene (unmodified with sulphur) | 100 | 100 | 100 | 100 | 100 |
| Stearic acid | 0.5 | 0.5 | 0.5 | 0.5 | 0.5 |
| Magnesium oxide, light | 4 | 4 | 4 | 4 | 4 |
| Alkylated diphenyl amine | 2 | 2 | 2 | 2 | 2 |
| Carbon black N 762 | 30 | 30 | 30 | 30 | 30 |
| Zinc oxide | 5 | 5 | 5 | 5 | 5 |
| I (6-ethoxy) | 2 | — | — | — | — |
| II (6-phenyl) | — | 2 | — | — | — |
| III (6-dodecyl) | — | — | 2 | — | — |
| IV (acridane) | — | — | — | 2 | — |
| Sulphur | — | — | — | — | 0.5 |
| o-tolyl biguanide | — | — | — | — | 1 |
| Tetramethyl thiuram monosulphide | — | — | — | — | 1 |
| Mooney scorch time, 120° C. MS5 (mins.) | 33 | >45 | >45 | >45 | >45 |

Vulcanisate properties on standard ring I (150° C./30')

| | A | B | C | D | E |
|---|---|---|---|---|---|
| Tensile strength (MPa) | 19.0 | 15.7 | 16.7 | 18.7 | 19.9 |
| Elongation at break (%) | 675 | 750 | 735 | 730 | 625 |
| Modulus at 300% elongation (MPa) | 5.0 | 3.6 | 3.9 | 4.5 | 6.5 |
| Hardness (Shore A) | 53 | 50 | 50 | 51 | 58 |

EXAMPLE 3

Cross-linking of polychloroprene with quinoline, indole and carbazole compounds:

| | |
|---|---|
| 1H-indole | = I |
| 2-methyl-1H-indole | = II |
| 2,3,5-trimethyl-1H-indole | = III |
| 4-methyl quinoline | = IV |
| Quinoline | = V |
| 9H-carbazol-2-ol | = VI |
| Isoquinoline | = VII |
| 6-methyl quinoline | = VIII |

Production of mixture in known manner (the comparison cross-linking system is a conventional sulphur/guanidine/thiuram system).

| | A | B | C | D | E | F | G | H | I |
|---|---|---|---|---|---|---|---|---|---|
| Polychloroprene unmodified with sulphur | 100 | 100 | 100 | 100 | 100 | 100 | 100 | 100 | 100 |
| Stearic acid | 0.5 | 0.5 | 0.5 | 0.5 | 0.5 | 0.5 | 0.5 | 0.5 | 0.5 |
| MgO, light | 4 | 4 | 4 | 4 | 4 | 4 | 4 | 4 | 4 |
| Alkylated diphenyl amine | 2 | 2 | 2 | 2 | 2 | 2 | 2 | 2 | 2 |
| Carbon black N 762 | 30 | 30 | 30 | 30 | 30 | 30 | 30 | 30 | 30 |
| Zinc oxide | 5 | 5 | 5 | 5 | 5 | 5 | 5 | 5 | 5 |
| I | 2 | — | — | — | — | — | — | — | — |
| II | — | 2 | — | — | — | — | — | — | — |
| III | — | — | 2 | — | — | — | — | — | — |
| IV | — | — | — | 2 | — | — | — | — | — |
| V | — | — | — | — | 2 | — | — | — | — |
| VI | — | — | — | — | — | 2 | — | — | — |
| VII | — | — | — | — | — | — | 2 | — | — |
| VIII | — | — | — | — | — | — | — | 2 | — |
| Sulphur | — | — | — | — | — | — | — | — | 0.5 |
| Tetramethyl thiuram monosulphide | — | — | — | — | — | — | — | — | 1 |
| o-tolyl biguanide | — | — | — | — | — | — | — | — | 1 |

Vulkameter 170° C./20 minutes running time:

| | A | B | C | D | E |
|---|---|---|---|---|---|
| Minimum shear modulus (N) | 0.8 | 0.7 | 1.0 | 0.3 | 0.9 |
| Maximum shear modulus (N) | 17.9 | 17.7 | 18.0 | 19.7 | 21.3 |
| $T_{10}$ (minutes) | 3.9 | 3.8 | 3.7 | 3.4 | 4.7 |
| $T_{50}$ (minutes) | 6.3 | 5.9 | 6.0 | 9.9 | 9.9 |

-continued

|  |  |  |  |  |
|---|---|---|---|---|
| $T_{80}$ (minutes) | 9.7 | 8.4 | 9.4 | 15.0 | 14.4 |
| $T_{90}$ (minutes) | 12.8 | 11.7 | 12.4 | 17.1 | 16.7 |

|  | F | G | H | I |
|---|---|---|---|---|
| Minimum shear modulus (N) | 1.1 | 1.0 | 0.8 | 0.1 |
| Maximum shear modulus (N) | 20.5 | 22.1 | 21.7 | 21.0 |
| $T_{10}$ (minutes) | 1.8 | 3.7 | 4.6 | 3.8 |
| $T_{50}$ (minutes) | 2.7 | 10.2 | 10.2 | 5.5 |
| $T_{80}$ (minutes) | 4.1 | 14.8 | 14.7 | 7.9 |
| $T_{90}$ (minutes) | 7.9 | 17.0 | 16.9 | 10.8 |

EXAMPLE 4

Cross-linking of polychloroprene with further derivatives of 2,2,4-trimethyl-1,2-dihydroquinoline (TMDHCH):

| | |
|---|---|
| Oligomeric TMDHCH, methyl group on the benzene nucleus, indefinite position | = I |
| TMDHCH, coupled in the 6-position through $CH_2$ | = II |
| Oligomer mixture of 7-methyl-TMDHCH and 5-methyl-TMDHCH | = III |
| Oligomeric 6-methyl-TMDHCH | = IV |
| Oligomeric 8-methyl-TMDHCH | = V |
| Oligomeric TMDHCH (Mp. approx. 70° C.) | = VI |

Production of mixture in known manner (the preferred TMDHCH melting at approximately 70° C. is used for comparison)

|  | A | B | C | D | E | F |
|---|---|---|---|---|---|---|
| Polychloroprene unmodified with sulphur | 100 | 100 | 100 | 100 | 100 | 100 |
| Stearic acid | 0.5 | 0.5 | 0.5 | 0.5 | 0.5 | 0.5 |
| Magnesium oxide, light | 4 | 4 | 4 | 4 | 4 | 4 |
| Alkylated diphenyl amine | 2 | 2 | 2 | 2 | 2 | 2 |
| Carbon black N 762 | 30 | 30 | 30 | 30 | 30 | 30 |
| Zinc oxide | 5 | 5 | 5 | 5 | 5 | 5 |
| I | 2 | — | — | — | — | — |
| II | — | 2 | — | — | — | — |
| III | — | — | 2 | — | — | — |
| IV | — | — | — | 2 | — | — |
| V | — | — | — | — | 2 | — |
| VI | — | — | — | — | — | 2 |

Mooney scorch time 120° C. MS5 (minutes)

|  | A | B | C | D | E | F |
|---|---|---|---|---|---|---|
| After production of mixture | 27 | 11 | 37 | 34 | 32 | 8 |
| After 7 days at 20° C. | 28 | 9 | 36 | 33 | 29 | 5 |
| After 14 days at 20° C. | 24 | 5 | 34 | 29 | 25 | 6 |
| After 28 days at 20° C. | 20 | 1 | 25 | 20 | 23 | 1 |

Defo elasticity at 80° C. (%):
Approx. 60% corresponds to complete cross-linking

|  | A | B | C | D | E | F |
|---|---|---|---|---|---|---|
| After production of mixture | 20 | 21 | 21 | 20 | 21 | 21 |
| After 4 days at 40° C. | 23 | 43 | 24 | 22 | 22 | 50 |
| After 7 days at 40° C. | 31 | 50 | 27 | 29 | 29 | 58 |
| After 14 days at 40° C. | 45 | 58 | 43 | 46 | 39 | 60 |

Defo elasticity at 80° C. (%):

|  | A | B | C | D | E | F |
|---|---|---|---|---|---|---|
| After production of mixture | 20 | 21 | 21 | 20 | 21 | 21 |
| After 1 day at 70° C. | 39 | 56 | 33 | 34 | 34 | 60 |
| After 2 days at 70° C. | 60 | 60 | 60 | 60 | 50 | — |

Vulcanisate properties on standard bar S2 (170° C./10 mins.):

-continued

|  | A | B | C | D | E | F |
|---|---|---|---|---|---|---|
| Tensile strength (MPa) | 21.3 | 20.3 | 21.8 | 19.7 | 21.7 | 20.6 |
| Elongation at break (%) | 615 | 500 | 695 | 670 | 555 | 485 |
| Modulus at 300% elongation (MPa) | 7.7 | 10.3 | 6.3 | 5.7 | 8.7 | 10.7 |
| Hardness (Shore A) | 56 | 60 | 54 | 52 | 58 | 60 |

EXAMPLE 5

Cross-linking of polychloroprene with TMDHCH analogues:

2,2-dimethyl-1,2-hydroquinoline with S in the 4-position in the heteronucleus, "dimerised" in the 6-position through $CH_2$ = I (general formula (8))
1H-indole, "trimerised" in the 3-position through CH = II (general formula (7))
Production of mixture in known manner.

| Polychloroprene unmodified | A | B |
|---|---|---|
| with sulphur | 100 | 100 |
| Stearic acid | 0.5 | 0.5 |
| Magnesium oxide, light | 4 | 4 |
| Alkylated diphenyl amine | 2 | 2 |
| Carbon black N 762 | 30 | 30 |
| Zinc oxide | 5 | 5 |
| I | 2 | — |
| II | — | 2 |
| Mooney scorch time 120° C. MS5 (mins.) | 41 | >45 |

Vulkameter 170° C. (40 mins. running time):

|  |  | A | B |
|---|---|---|---|
| Minimum shear modulus | (N) | 1.2 | 1.5 |
| Maximum shear modulus | (N) | 22.4 | 24.9 |
| $T_{10}$ | (mins.) | 3.1 | 5.0 |
| $T_{50}$ | (mins.) | 5.1 | 14.5 |
| $T_{80}$ | (mins.) | 6.6 | 21.7 |
| $T_{90}$ | (mins.) | 8.1 | 26.9 |

Vulcanisate properties on standard bar S2 170° C./mins. 10,30):

|  | A | B |
|---|---|---|
| Tensile strength (MPa) | 23.2 | 19.9 |
| Elongation at break (%) | 650 | 585 |
| Modulus at 300% elongation (MPa) | 6.7 | 7.2 |
| Hardness (Shore A) | 54 | 58 |

EXAMPLE 6

Cross-linking of bromobutyl rubber with TMDHCH:
Production of mixture in known manner

| Bromobutyl rubber (Bromo-Butyl X2, a Polysar product) | A | B |
|---|---|---|
|  | 100 | 100 |
| Carbon black N 650 | 68 | 68 |
| Paraffinic mineral oil | 20 | 20 |
| Stearic acid | 0.5 | 0.5 |
| Coresin | 2 | 2 |
| Liquid coumarone resin | 2 | 2 |
| Phenyl-$\beta$-naphthyl amine | 1.5 | 1.5 |

| -continued | | |
|---|---|---|
| Magnesium oxide | 0.4 | 0.4 |
| Zinc oxide | 3 | 3 |
| Dibenzothiazyl disulphide | 1.25 | — |
| Sulphur | 1 | — |
| TMDHCH (Mp. approx. 70° C.) | — | 2 |

(This formulation is the conventional formulation for innerliner of tubeless tyres).

Mooney scorch time 120° C. MS5 (minutes):

| After production of mixture | 33 | 8 |
|---|---|---|

Mooney viscosity 100° C. ML1 + 4 (ME):

| | | |
|---|---|---|
| After production of mixture | 61 | 64 |
| After 3 days at 20° C. | 62 | 76 |
| After 7 days at 20° C. | 63 | 96 |
| After 14 days at 20° C. | 65 | >200 |

Defo hardness at 80° C. (N):

| | | |
|---|---|---|
| After production of mixture | 11.8 | 15.0 |
| After 3 days at 20° C. | 9.5 | 26.5 |
| After 7 days at 20° C. | 9.7 | 40.0 |
| After 14 days at 20° C. | 10.2 | 58.0 |
| After 28 days at 20° C. | 11.8 | 107.9 |

Defo elasticity at 80° C. (%):
(60% corresponds to complete cross-linking)

| | | |
|---|---|---|
| After production of mixture | 10 | 13 |
| After 3 days at 20° C. | 10 | 43 |
| After 7 days at 20° C. | 9 | 51 |
| After 14 days at 20° C. | 9 | 55 |
| After 28 days at 20° C. | 9 | 60 |

Vulcanisate properties on standard ring I (150° C./30'):

| | | |
|---|---|---|
| Tensile strength (MPa) | 9.3 | 8.1 |
| Elongation at break (%) | 480 | 235 |
| Modulus at 100% elongation (MPa) | 1.7 | 3.0 |
| Hardness (Shore A) | 60 | 65 |

EXAMPLE 7

Cross-linking of chlorobutyl rubber with TMDHCH:
Production of mixture in known manner.

| | A | B |
|---|---|---|
| Chlorobutyl rubber (Butyl HT 10-66, an Esso product) | 100 | 100 |
| Paraffin oil | 5 | 5 |
| Coumarone resin | 3 | 3 |
| Stearic acid | 2 | 2 |
| Carbon black N 539 | 30 | 30 |
| Whitetex No. 2. | 50 | 50 |
| Zinc oxide | 3 | 3 |
| Diphenyl thiourea | 0.5 | — |
| Zinc-N-ethyl phenyl dithiocarbamate | 1 | — |
| TMDHCH (Mp. approx. 70° C.) | — | 2 |

(This formulation represents the conventional formulation for self-vulcanising lining film)

Mooney scorch time 120° C. MS5 (minutes):

| | | |
|---|---|---|
| After production of mixture | 7 | 24 |
| After 2 days at 70° C. | 6 | 12 |
| After 4 days at 70° C. | vulcanised | 7 |
| After 7 days at 70° C. | " | vulcanised |

Mooney viscosity 100° C. ML1 + 4 (Me):

| | | |
|---|---|---|
| After production of mixture | 68 | 66 |
| After 2 days at 70° C. | >200 | 81 |
| After 4 days at 70° C. | >200 | 122 |
| After 7 days at 70° C. | >200 | >200 |

Defo hardness at 80° C. (N):

| | | |
|---|---|---|
| After production of mixture | 11.8 | 12.0 |
| After 2 days at 70° C. | 107.9 | 18.1 |
| After 4 days at 70° C. | 152.0 | 41.7 |
| After 7 days at 70° C. | 166.7 | 100.1 |

Defo elasticity at 80° C. (%):
(60% corresponds to complete cross-linking)

| | | |
|---|---|---|
| After production of mixture | 14 | 13 |
| After 2 days at 70° C. | 60 | 17 |
| After 4 days at 70° C. | 58 | 45 |
| After 7 days at 70° C. | 58 | 57 |

Vulcanisate properties on standard ring I (150° C./30'):

| | | |
|---|---|---|
| Tensile strength (MPa) | 7.5 | 6.5 |
| Elongation at break (%) | 590 | 390 |
| Modulus at 300% elongation (MPa) | 3.6 | 5.1 |
| Hardness (Shore A) | 54 | 61 |

EXAMPLE 8

Reaction of TMDHCH (Mp. approx. 70° C.) with chlorinated rubber:

| | | A | B |
|---|---|---|---|
| Chlorinated rubber (Pergut S40) | (g) | 100 | 100 |
| Trichlorethylene | (cc) | 250 | 250 |
| Toluene | (cc) | 250 | 250 |
| TMDHCH (Mp. approx. 70° C.) | (g) | — | 10 |

A film was cast. Drying and storage for 6 days at 20° C., followed by 1 day at 70° C.

Testing of the melting behaviour of the film under a microscope:
A and B soften at approximately 115° C.
Film A begins to form bubbles at 115° C.
Film B only forms bubbles beyond 160° C.

EXAMPLE 9

Cross-linking with 2,2,4-trimethyl-1,2-dihydroquinoline (TMDHCH).
Self-vulcanisation of polychloroprene.
Production of mixture in known manner.

| | A | B |
|---|---|---|
| Polychloroprene unmodified with sulphur | 100 | 100 |
| Carbon black N330 | 25 | 25 |
| Kaolin, soft | 60 | 60 |
| Factice | 10 | 10 |
| Aromatic mineral oil | 12 | 12 |
| Coumarone resin | 5 | 5 |
| Alkylated diphenyl amine | 1.5 | 1.5 |
| Stearic acid | 0.5 | 0.5 |
| Red lead | 20 | 20 |
| Aldehyde amine accelerator (condensation product of homologous amines with aromatic bases) | 2 | — |
| Diphenyl thiourea | 2 | — |
| TMDHCH (Mp. approximately 70° C.) | — | 2 |

(This formulation is the conventional formulation for self-vulcanisation, for example for lining containers)

Mooney scorch time 120° C. MS 5 (mins.):

| | | |
|---|---|---|
| After production of mixture | 1.5 | 9.5 |
| After 3 days at 20° C. | 0.5 | 6.8 |
| After 7 days at 20° C. approx. | 0.5 | 3.4 |

Mooney viscosity 100° C. ML1 + 4 (ME):

| | | |
|---|---|---|
| After production of mixture | 74 | 52 |
| After 3 days at 20° C. | >200 | 65 |
| After 7 days at 20° C. | >200 | 100 |

-continued

| | | |
|---|---|---|
| After 14 days at 20° C. | >200 | >200 |
| Defo hardness at 80° C. (N): | | |
| After production of mixture | 9.5 | 7.3 |
| After 3 days at 20° C. | 32.5 | 10.0 |
| After 7 days at 20° C. | 39.0 | 15.5 |
| After 14 days at 20° C. | 45.5 | 28.5 |
| After 28 days at 20° C. | 65.0 | 62.5 |
| Defo elasticity at 80° C. (%): (60% corresponds to complete cross-linking) | | |
| After production of mixture | 23 | 15 |
| After 3 days at 20° C. | 47 | 18 |
| After 7 days at 20° C. | 51 | 30 |
| After 14 days at 20° C. | 53 | 48 |
| After 28 days at 20° C. | 56 | 58 |
| Vulcanisate properties on standard bar S2: Tensile strength (MPa) | | |
| After 14 days at 20° C. | 1.8 | 2.1 |
| After 28 days at 20° C. | 3.0 | 3.8 |
| Elongation at break (%) | | |
| After 14 days at 20° C. | 580 | 480 |
| After 28 days at 20° C. | 720 | 630 |
| Modulus at 200% elongation (MPa) | | |
| After 14 days at 20° C. | 1.6 | 2.0 |
| After 28 days at 20° C. | 2.0 | 2.7 |
| Hardness (Shore A) | | |
| After 14 days at 20° C. | 38 | 38 |
| After 28 days at 20° C. | 43 | 46 |

EXAMPLE 10

| | |
|---|---|
| Production of a polychloroprene sealing profile of large volume. Pressureless vulcanisation at slightly elevated temperature. Production of mixture in known manner (Formulation for CR-lock seal) extrusion in a vacuum extruder | |
| Polychloroprene, unmodified with sulphur, minimal tendency towards crystallisation | 100 |
| Carbon black N 539 | 35 |
| Carbon black N 990 | 25 |
| Aromatic mineral oil | 5 |
| Wax anti-ozonant | 2 |
| Stearic acid | 0.5 |
| Alkylated diphenyl amine | 2 |
| p-phenylene diamine | 1 |
| Magnesium oxide, light, paste-form | 4 |
| Zinc oxide | 5 |
| TMDHCH (Mp. approx. 70° C.) | 2 |
| Mooney scorch time 120° C. MS5 (mins.): | 11 |

| Vulcanisate properties on standard bar S3: Vulcanisation method: | A | B | C |
|---|---|---|---|
| Tensile strength (MPa) | 18.4 | 11.0 | 14.2 |
| Elongation at break (%) | 235 | 590 | 180 |
| Modulus at 200% elongation (MPa) | 16.5 | 4.1 | 15.5 |
| Microhardness (IRHD)(*) | 67 | 44 | 71 |

A = 45 mins./150° C. in steam (= 4 atms. gauge)
B = 5 days/40° C. in a heating cabinet (pressureless)
C = 5 days/70° C. in a heating cabinet (pressureless)
(*) ISO 48-1975

EXAMPLE 11

| | |
|---|---|
| Production of a sealing plate of polychloroprene by pressureless vulcanisation at room temperature and slightly elevated temperature: Production of mixture in known manner Calendering in the conventional way in a 3-roll calender | |
| Polychloroprene[1] | 50 |

-continued

| | |
|---|---|
| Polychloroprene[2] | 50 |
| Carbon black N 539 | 40 |
| Synthetic plasticiser[3] | 10 |
| Synthetic plasticiser[4] | 5 |
| Factice | 10 |
| Magnesium oxide, light, paste form | 4 |
| Stearic acid | 1 |
| Wax anti-ozonant | 2 |
| Anti-ozonant and anti-ager[5] | 2 |
| TMDHCH (Mp. approx. 70° C.) | 2 |
| Mooney scorch time 120° C. (MS5/mins) | 15 |

| Vulcanisate properties on standard bar S2: Vulcanisation method | A | B | C | D | E |
|---|---|---|---|---|---|
| Tensile strength (MPa) | 11.3 | 11.8 | 5.5 | 10.0 | 11.6 |
| Elongation at break (%) | 425 | 400 | 790 | 700 | 690 |
| Modulus at 300% elongation (MPa) | 7.8 | 8.7 | 2.4 | 4.6 | 5.0 |
| Microhardness (IRHD) | 42 | 50 | 37 | 39 | 40 |

A = 40 mins. at 150° C. in hot air with 3 atms. gauge compressed air.
B = 40 mins. at 150° C. in superheated steam (4 atms. gauge)
C = 28 days at room temperature, pressureless.
D = 14 days at 40° C. pressureless
E = 2 days at 70° C. pressureless

[1] unmodified with sulphur, minimal crystallisation
[2] unmodified with sulphur, medium crystallisation, pre-cross-linked
[3] ether thioether: Vulkanol OT
[4] aromatic polyether: Vulkanol FH
[5] benzofuran derivative: Vulkanox AFC

EXAMPLE 12

| | |
|---|---|
| Shaping and pre-vulcanisation of a polychloroprene sealing plate in a hydraulic press and pressureless vulcanisation at room temperature and slightly elevated temperature: For formulation, see Example 11. | |
| Mooney scorch time 120° C. (MS5/mins.): | 15 |
| Vulkameter 170° C. (running time 40 mins.): | |
| Minimum shear modulus (N) | 3.7 |
| Maximum shear modulus (N) | 35.0 |
| $T_{10}$ (mins.) | 2.1 (approx. 2) |
| $T_{50}$ (mins.) | 5.8 |
| $T_{80}$ (mins.) | 13.8 (approx.14) |
| $T_{90}$ (mins.) | 18.3 |

| Vulcanisate properties on standard bar S3: Stage heating in a hydraulic press at 170° C., 2 mm plates. heating time (mins.) | 2 | 4 | 14 |
|---|---|---|---|
| Tensile strength (MPa) | 9.0 | 14.0 | 14.1 |
| Elongation at break (%) | 640 | 450 | 355 |
| Modulus at 300% elongation (MPa) | 4.2 | 8.7 | 12.0 |
| Microhardness | 33 | 49 | 52 |

| Storage of the pre-vulcanised plate, Heating stage 170° C. 2 mins. 28 days at room temperature | |
|---|---|
| Tensile strength (MPa) | 9.9 |
| Elongation at break (%) | 520 |
| Modulus at 300% elongation (MPa) | 5.0 |
| Microhardness (IRHD) | 46 |

| 14 days at 40° C. | |
|---|---|
| Tensile strength (MPa) | 13.0 |
| Elongation at break (%) | 500 |
| Modulus at 300% elongation (MPa) | 7.3 |
| Microhardness (IRHD) | 45 |

| 4 days at 70° C. | |
|---|---|
| Tensile strength (MPa) | 14.8 |

| -continued | |
|---|---|
| Elongation at break (%) | 430 |
| Modulus at 300% elongation (MPa) | 10.3 |
| Microhardness (IRHD) | 48 |

The plates of the 2-minute heating stage may be re-plasticised on mixing rolls or in a refiner.

EXAMPLE 13

Cross-linking of adhesive-grade polychloroprene with TMDHCH

An adhesive was produced in known manner using the following formulation. The TMDHCH (Mp. approx. 70° C.) was dissolved beforehand in a plasticiser[1] of the alkyl sulphonic acid alkylphenyl ester type in a ratio of 1:2 parts by weight. Test rubber sole plates(*) were bonded in the conventional way and, after certain periods of storage, resistance to separation was determined at 70° C. In addition, the viscosity of the adhesive solution was followed during storage at 20° C.

| | |
|---|---|
| Polychloroprene, adhesive grade[2] | 50 |
| Polychloroprene, normal grade[3] | 50 |
| Magnesium oxide, light | 4 |
| Zinc oxide | 4 |
| 2,6-di-t-butyl-p-cresol[4] | 2 |
| 45 g of chlorinated rubber[5] per kg of mixture | |

| | |
|---|---|
| Solution composition: | 1 part of mixture |
| | 4 parts of solvent mixture |
| Solvent: | 2 parts of ethyl acetate |
| | 2 parts of petrol |
| | 1 part of toluene |

| Addition of: | |
|---|---|
| TMDHCH (Mp. approx. 70° C.) | 10 parts, by weight,/100 rubber |
| Plasticiser (see above) | 20 parts, by weight,/100 rubber |

(*)Nora rubber, hardness (Shore A) approx. 92, basis SBR, a Freudenberg product

Separation force measured at 70° C. (i.e. no more crystallisation)

| After storage at 20° C./ | 0 day | (N/30mm) | 1.0(*) |
|---|---|---|---|
| (self-cross-linking) | 3 days | | 16.0 |
| | 7 days | | 26.0 |
| | 14 days | | 35.0 |
| After storage at 40° C./ | 0 day | (N/30mm) | 1.0 |
| (self-cross-linking | 2 days | | 47.0 |
| at slightly elevated | 3 days | | 49.0 |
| temperature) | 7 days | | 50.0 |
| | 14 days | | 35.0 |
| After storage at 70° C./ | 0 day | (N/30mm) | 1.0 |
| | 1 day | | 40.0 |
| | 2 days | | 24.0 |
| | 3 days | | 19.0 |
| | 7 days | | 20.0 |

(*)This separation force corresponds to an 0-test because, as a two-component adhesive, this adhesive cannot show any significant separation force in the decrystallised state (known to those skilled in the art)

Viscosity of the adhesive solution after storage at 20° C. measured using a Brookfield LVT viscosimeter, spindle 4, 60 r.p.m.

| | |
|---|---|
| 0 day | 2520 mPa/second |
| 5 days | 2360 mPa/second |
| 20 days | 2550 mPa/second |

[1]Vulkanol SF.
[2]Baypren 321.
[3]Baypren 233.
[4]Vulkanox KB.
[5]Pergut S40

EXAMPLE 14

Cross-linking of polychloroprene latex

Preparation of the latex mixtures in known manner, the TMDHCH (melting point approx. 70° C.) being ground with 20% emulsifier(*) (1:1) in a mortar. Zinc oxide in the form of a 33% paste was added to the emulsified/suspended TMDHCH, the whole then being further ground. Films approximately 1.5 mm thick were then cast onto clay plates.

| | A | B |
|---|---|---|
| Polychloroprene latex (58%)() | 173 | 173(*) |
| Zinc oxide (33%) | — | 15 |
| TMDHCH (Mp. approx. 70° C.) | — | 6 |
| Emulsifier (20%) | — | 6 |
| Films stored for 6 days at 40° C. (self-vulcanisation at slightly elevated temperature) | | |
| Swelling in ASTM oil 3 at 70° C. | | |
| Increase in weight after 4 days (%) | 142 | 76 |

(*) Emulvin
(**) Baypren latex MKB
(***) A test with zinc oxide alone was unnecessary because those skilled in the art know that no significant cross-linking reaction occurs for 6 days at 40° C.

EXAMPLE 15

Cross-linking of polychloroprene with TMDHCH in different states of oligomerisation:
Production of mixture in known manner:

| | A | B | C | D |
|---|---|---|---|---|
| Polychloroprene unmodified with sulphur | 100 | 100 | 100 | 100 |
| Stearic acid | 0.5 | 0.5 | 0.5 | 0.5 |
| Magnesium oxide, light | 4 | 4 | 4 | 4 |
| Alkylated diphenyl amine | 2 | 2 | 2 | 2 |
| Carbon black N 762 | 30 | 30 | 30 | 30 |
| Zinc oxide | 5 | 5 | 5 | 5 |
| TMDHCH (Mp. >70° C.) | 2 | — | — | — |
| TMDHCH (Mp. approx. 70° C.) | — | 2 | — | — |
| TMDHCH, liquid(*) | — | — | 2 | — |
| TMDHCH monomeric (**) | — | — | — | 2 |

| Mooney scorch time 120° C. (MS5/mins.): | | | | |
|---|---|---|---|---|
| After production of mixture | 10 | 11 | 23 | 42 |
| After 1 day at 70° C. | 10 | sc. | 4 | 8 |
| After 2 days at 70° C. | sc. | sc. | sc. | sc. |

| Vulkameter 170° C. (running time 40 mins.): | | | | |
|---|---|---|---|---|
| Maximum shear modulus (N) | 24.8 | 36.3 | 24.3 | 23.9 |
| $T_{10}$ (mins.) | 1.7 | 2.0 | 2.4 | 2.6 |
| $T_{50}$ (mins.) | 3.4 | 3.4 | 4.1 | 4.2 |
| $T_{80}$ (mins.) | 4.5 | 4.4 | 5.6 | 8.0 |
| $T_{90}$ (mins.) | 5.1 | 5.3 | 11.2 | 16.6 |

| Defo hardness at 80° C. (N) | A | B | C | D |
|---|---|---|---|---|
| After production of mixture | 7.8 | 8.4 | 7.7 | 7.7 |
| After 1 day at 40° C. | 10.1 | 10.5 | 7.8 | 7.4 |
| After 2 days at 40° C. | 17.7 | 18.6 | 9.8 | 7.8 |
| After 4 days at 40° C. | 31.4 | 29.4 | 12.3 | 7.8 |
| After 7 days at 40° C. | 53.9 | 58.8 | 19.1 | 9.1 |
| After 14 days at 40° C. | 147.1 | >200 | >200 | >200 |
| After 1 day at 70° C. | 63.7 | 78.5 | 25.0 | 11.0 |
| After 2 days at 70° C. | >200 | >200 | >200 | 196.1 |
| After 4 days at 70° C. | >200 | >200 | >200 | >200 |

(*) Mixture of monomeric TMDHCH with low-oligomeric TMDHCH
(**) Approx. 97% monomeric, distilled in vacuo.

Vulcanisate properties on standard ring I (170° C./10 mins.):

| | | | | |
|---|---|---|---|---|
| Tensile strength (MPa) | 18.4 | 18.3 | 18.7 | 18.4 |
| Elongation at break (%) | 550 | 445 | 625 | 645 |
| Modulus at 300% elongation (MPa) | 7.1 | 9.7 | 5.8 | 5.2 |
| Hardness (Shore A) | 57 | 62 | 54 | 53 |

Compression set (%) 70h/100° C.

| Heating stage: | 170° C./10' | 30 | 22 | 40 | 43 |
|---|---|---|---|---|---|
| | 15' | 27 | 19 | 33 | 37 |

-continued

| | | | | | |
|---|---|---|---|---|---|
| 20' | 27 | 18 | 31 | 35 | |

| | | | | | |
|---|---|---|---|---|---|
| Resilience (%) | 49 | 48 | 46 | 43 | 45 |

EXAMPLE 16

| Cross-linking of polychloroprene without metal oxides: | | | |
|---|---|---|---|
| | A | B | C |
| Polychloroprene unmodified with sulphur | 100 | 100 | 100 |
| Stearic acid | 0.5 | 0.5 | 0.5 |
| Magnesium oxide, light | 4 | — | — |
| Zinc oxide | 5 | — | — |
| TMDHCH (Mp. approx. 70° C.) | 2 | 2 | 1 |

| Mooney viscosity ML4/100° C. (ME): | | | |
|---|---|---|---|
| After production of mixture | 49 | 49 | 45 |
| After 1 day at 70° C. | >200 | 183 | 140 |
| After 2 days at 70° C. | >200 | >200 | 183 |
| After 3 days at 70° C. | >200 | >200 | >200 |

EXAMPLE 17

Cross-linking of sulphur-modified polychloroprene
Production of CR mixtures in known manner in accordance with the following formulation in a laboratory internal mixer:

| Polychloroprene | A | B | C | D | E |
|---|---|---|---|---|---|
| (sulphur-modified) | 100 | 100 | 50 | — | — |
| Polychloroprene (unmodified with sulphur) | — | — | 50 | 100 | 100 |
| Stearic acid | 0.5 | 0.5 | 0.5 | 0.5 | 0.5 |
| Phenyl-β-naphthyl amine | 2 | 2 | 2 | 2 | 2 |
| Carbon black N 762 | 30 | 30 | 30 | 30 | 30 |
| Zinc oxide, active | 5 | 5 | 5 | 5 | 5 |
| TMDHCH (Mp. approx. 70° C.) | — | 2 | 2 | 2 | — |
| Ethylene thiourea | — | — | — | — | 0.5 |
| MgO, light | 4 | 4 | 4 | 4 | 4 |

| Mooney scorch time 120° C.: | | | | | |
|---|---|---|---|---|---|
| MS t5 (mins.) | 20 | 10 | 10 | 11 | 10 |

| Vulkameter 150° C. (running time 40 mins.): Maximum shear modulus | | | | | |
|---|---|---|---|---|---|
| (N) | 34.0 | 39.0 | 36.0 | 30.0 | 30.0 |
| $T_{10}$ (mins.) | 3.5 | 2.5 | 2.5 | 3.5 | 3.0 |
| $T_{50}$ (mins.) | 5.5 | 3.5 | 4.0 | 6.0 | 8.0 |
| $T_{80}$ (mins.) | 8.5 | 5.0 | 5.5 | 8.0 | 15.0 |
| $T_{90}$ (mins.) | 21.0 | 7.0 | 7.5 | 9.0 | 21.0 |

| Vulkameter 170° C. (running time 20 mins.): Maximum shear modulus | | | | | |
|---|---|---|---|---|---|
| (N) | 35.0 | 37.0 | 33.0 | 25.0 | 28.0 |
| $T_{10}$ (mins.) | 1.9 | 1.5 | 1.5 | 2.0 | 1.8 |
| $T_{50}$ (mins.) | 2.4 | 2.0 | 2.1 | 2.8 | 3.5 |
| $T_{80}$ (mins.) | 4.8 | 2.7 | 2.7 | 3.4 | 6.2 |
| $T_{90}$ (mins.) | 9.0 | 7.0 | 4.1 | 3.7 | 9.0 |

| Vulcanisate properties, heating at 150° C. 20' 30' 45' (average values) | | | | | |
|---|---|---|---|---|---|
| Tensile strength (MPa) | 18.0 | 17.8 | 15.5 | 17.5 | 18.4 |
| Elongation at break (%) | 620 | 510 | 495 | 525 | 505 |
| Modulus at 300% elongation (MPa) | 7.1 | 9.1 | 8.0 | 7.5 | 8.3 |
| Hardness (Shore A) | 61 | 64 | 61 | 59 | 60 |

EXAMPLE 18

Mooney viscosity stabilisation of sulphur-modified polychloroprene using TMDHCH and TMDHCH-6-ethoxy Production of mixture in known manner

| (A) Sulphur-modified Polychloroprene | 100 | 100 | 100 | 100 |
|---|---|---|---|---|
| TMDHCH, monomeric | — | 0.05 | 0.1 | 0.2 |

| Mooney viscosity (ML4/100° C. (ME) | | | | |
|---|---|---|---|---|
| Immediately after addition | 33 | 31 | 32 | 32 |
| After storage for 1 day at 70° C. | 30 | 31 | 32 | 33 |

| Mooney Viscosity (ML10/100° C. (ME): | | | | |
|---|---|---|---|---|
| Immediately after addition | 29 | 27 | 28 | 28 |
| After storage for 1 day at 70° C. | 26 | 26 | 27 | 28 |
| (B) Sulphur-modified polychloroprene | 100 | 100 | 100 | 100 |
| TMDHCH-6-ethoxy, monomeric | — | 0.05 | 0.1 | 0.2 |

| Mooney viscosity (ML4/100° C. (ME): | | | | |
|---|---|---|---|---|
| Immediately after addition | 35 | 31 | 32 | 31 |
| After storage for 1 day at 70° C. | 32 | 32 | 32 | 32 |

| Mooney viscosity (ML10/100° C. (ME): | | | | |
|---|---|---|---|---|
| Immediately after addition | 30 | 28 | 28 | 28 |
| After storage for 1 day at 70° C. | 27 | 27 | 27 | 28 |

EXAMPLE 19

Cross-linking of polychloroprene with TMDHCH (Mp approx. 70° C.)
Dynamic crack formation and crack growth:

| | A | B | C | D | E |
|---|---|---|---|---|---|
| Polychloroprene, unmodified with sulphur | 100 | 100 | 100 | 100 | 100 |
| Magnesium oxide, light | 4 | 4 | 4 | 4 | 4 |
| Stearic acid | 0.5 | 0.5 | 0.5 | 0.5 | 0.5 |
| Carbon black N 762 | 30 | 30 | 30 | 30 | 30 |
| Zinc oxide, active | 5 | 5 | 5 | 5 | 5 |
| Alkylated diphenyl amine | 2 | 2 | 2 | 2 | 2 |
| Ethylene thiourea | 0.5 | 1 | — | — | — |
| Diphenyl thiourea | — | 1 | — | — | — |
| TMDHCH (Mp approx. 70° C.) | — | — | 1 | 1.5 | 2 |

| Vulkameter 150° C. (running time 40 mins.): | | | | | |
|---|---|---|---|---|---|
| Maximum shear modulus (N) | 28.6 | 38.9 | 29.5 | 31.2 | 33.9 |
| $T_{10}$ (mins.) | 3.6 | 1.7 | 4.7 | 4.8 | 4.4 |
| $T_{80}$ (mins.) | 18.5 | 11.4 | 12.5 | 12.4 | 10.8 |
| $T_{90}$ (mins.) | 24.5 | 19.1 | 14.6 | 14.2 | 12.3 |
| $T_{90}$-$T_{80}$ (mins.) | 6.0 | 7.7 | 2.1 | 1.8 | 1.5 |

-continued

Vulkameter 170° C. (running time 20 mins.):

| Maximum shear | | | | | |
|---|---|---|---|---|---|
| modulus (N) | 32.2 | 39.9 | 27.6 | 29.5 | 31.3 |
| $T_{10}$ (mins.) | 1.8 | 1.0 | 1.9 | 2.0 | 1.8 |
| $T_{80}$ (mins.) | 7.8 | 5.0 | 5.0 | 5.0 | 4.2 |
| $T_{90}$ (mins.) | 13.4 | 9.3 | 6.0 | 5.9 | 4.9 |
| $T_{90}$-$T_{80}$ (mins) | 5.6 | 4.3 | 1.0 | 0.9 | 0.7 |

De Mattia crack formation (170° C./20 mins.):

| 20% cracks (Kc) | 140 | 11 | >500 | >400 | >420 |
|---|---|---|---|---|---|

De Mattia crack growth (170° C./20 mins.):

| From 2 to 4 | | | | | |
|---|---|---|---|---|---|
| mm (Kc) | 1.5 | 0.1 | 7.0 | 8.2 | 3.5 |

EXAMPLE 20

Combination of TMDHCH (Mp. approx. 70° C.) with thioureas in the cross-linking of polychloroprene: production of mixture in known manner

| | A | B | C | D |
|---|---|---|---|---|
| Polychloroprene unmodified with sulphur | 100 | 100 | 100 | 100 |
| Magnesium oxide, light | 4 | 4 | 4 | 4 |
| Alkylated diphenyl amine | 2 | 2 | 2 | 2 |
| Stearic acid | 0.5 | 0.5 | 0.5 | 0.5 |
| Carbon black N 762 | 30 | 30 | 30 | 30 |
| Zinc oxide | 5 | 5 | 5 | 5 |
| TMDHCH (Mp approx. 70° C.) | 2 | 2 | 2 | 2 |
| Ethylene thiourea | — | 0.5 | — | — |
| Diphenyl thiourea | — | — | 1 | — |
| Diethyl thiourea | — | — | — | 1 |

Mooney scorch time:

| MS5/120° C. (mins.) | 12 | 9 | 7 | 5 |
|---|---|---|---|---|

Vulkameter 170° C. (running time 40 mins.):

| Maximum shear | | | | |
|---|---|---|---|---|
| modulus (N) | 47.6 | 51.2 | 43.5 | 49.0 |
| $T_{10}$ (mins.) | 2.3 | 1.8 | 1.3 | 1.0 |
| $T_{80}$ (mins.) | 8.8 | 7.1 | 3.4 | 3.3 |

Defo hardness/80° C. (N):
After production of mixture

| | | | | |
|---|---|---|---|---|
| | 8.8 | 8.8 | 8.8 | 8.8 |
| After 1 day at 70° C. | 50.0 | 61.3 | >200 | 161.8 |
| After 2 days at 70° C. | >200 | >200 | >200 | >200 |

Vulcanisate properties on standard ring I (170° C./10 mins.):

| Tensile strength (MPa) | 17.7 | 16.9 | 17.2 | 15.4 |
|---|---|---|---|---|
| Elongation at break (%) | 420 | 355 | 400 | 305 |
| Modulus at 300% elongation (MPa) | 10.7 | 13.3 | 11.0 | 14.6 |
| Hardness (Shore A) | 63 | 64 | 62 | 66 |
| Compression set 70h/100° C. (%) (20' heating) | 31 | 24 | 22 | 18 |

EXAMPLE 21

Combination of TMDHCH (Mp. approx 70° C.) with sulphur and guinidine/thiuram systems in the cross-linking of polychloroprene:
Production of mixture in known manner

| | A | B | C |
|---|---|---|---|
| Polychloroprene, unmodified with sulphur | 100 | 100 | 100 |
| Magnesium oxide, light | 4 | 4 | 4 |
| Alkylated diphenyl amine | 2 | 2 | 2 |
| Stearic acid | 0.5 | 0.5 | 0.5 |
| Carbon black N 762 | 30 | 30 | 30 |
| Zinc oxide | 5 | 5 | 5 |
| TMDHCH (Mp approx. 70° C.) | 2 | 2 | 2 |
| Sulphur | — | 0.5 | 0.5 |
| o-tolyl biguanide | — | — | 1 |
| Tetramethyl thiuram monosulphide | — | — | 1 |

Mooney scorch time 120° C. (MS5/mins.):

| After production of mixture | 12 | 11 | 11 |
|---|---|---|---|

Vulkameter 170° C. (running time 40 mins.):

| Maximum shear | | | |
|---|---|---|---|
| modulus (N) | 45.6 | 54.5 | 43.6 |
| $T_{10}$ (mins.) | 2.4 | 2.5 | 2.6 |
| $T_{80}$ (mins.) | 9.2 | 11.7 | 7.2 |

Defo hardness at 80° C. (N):

| After production of mixture | 8.1 | 8.3 | 7.6 |
|---|---|---|---|
| After 1 day at 70° C. | 54.9 | 57.8 | 46.1 |
| After 2 days at 70° C. | >200 | >200 | 157.9 |
| After 4 days at 70° C. | >200 | >200 | >200 |

Vulcanisate properties on standard ring I (170° C./15 mins.):

| Tensile strength (MPa) | 17.6 | 17.4 | 16.5 |
|---|---|---|---|
| Elongation at break (%) | 410 | 410 | 425 |
| Modulus at 300% elongation (MPa) | 10.8 | 11.0 | 9.6 |
| Hardness (Shore A) | 62 | 64 | 62 |

Compression set (%) after 70h/100° C.:

| Heating stage: 170° C./20 mins. | 26 | 31 | 33 |
|---|---|---|---|

EXAMPLE 22

Combination of TMDHCH (Mp. approx. 70° C.) with conventional accelerators, such as tetramethyl thiuram disulphide, hexamethylene tetramine and zinc-N-ethyl phenyl dithiocarbamate:
Basic formulation and production of mixture as in Examples 20 and 21

| | A | B | C | D |
|---|---|---|---|---|
| TMDHCH (Mp. approx. 70° C.) | 2 | 2 | 2 | 2 |
| Tetramethyl thiuram disulphide | — | 1 | — | — |
| Hexamethylene tetramine | — | — | 1 | — |
| Zinc-N-ethyl phenyl dithiocarbamate | — | — | — | 1 |

Mooney scorch time 120° C. MS5 (mins.):

| After production of mixture | 13 | 12 | 9 | 8 |
|---|---|---|---|---|

Vulkameter 170° C. (running time 40 mins.):

| Maximum shear | | | | |
|---|---|---|---|---|
| modulus (N) | 46.8 | 35.6 | 46.3 | 37.3 |

-continued

| | | | | |
|---|---|---|---|---|
| $T_{10}$ (mins.) | 2.7 | 2.0 | 2.1 | 1.6 |
| $T_{80}$ (mins.) | 11.4 | 7.9 | 8.4 | 5.1 |

| Defo hardness at 80° C. (N): | | | | |
|---|---|---|---|---|
| After production of mixture | 8.3 | 7.4 | 8.3 | 7.6 |
| After 1 day at 70° C. | 56.8 | 100.6 | 112.8 | >200 |
| After 2 days at 70° C. | 154.0 | >200 | 176.5 | >200 |
| After 4 days at 70° C. | >200 | >200 | >200 | >200 |

Defo elasticity at 80° C. (%):
(60% corresponds to complete cross-linking)

| | | | | |
|---|---|---|---|---|
| After production of mixture | 26 | 21 | 25 | 24 |
| After 1 day at 70° C. | 57 | 60 | 60 | — |
| After 2 days at 70° C. | 59 | — | 60 | — |
| After 4 days at 70° C. | — | — | — | — |

(For a Defo hardness of greater than 200, Defo elasticity cannot be measured because the sample is already vulcanised)

EXAMPLE 23

Cross-linking of polychloroprene using TMDHCH (Mp approx. 70° C.), kaolin as filler:
Production of mixture in known manner

| | A | B | C |
|---|---|---|---|
| Polychloroprene, unmodified with sulphur | 100 | 100 | 100 |
| Magnesium oxide, light | 4 | 4 | 4 |
| Stearic acid | 0.5 | 0.5 | 0.5 |
| Hard kaolin (Dixie Clay) | 80 | 80 | 80 |
| Aromatic mineral oil | 10 | 10 | 10 |
| Alkylated diphenyl amine | 2 | 2 | 2 |
| Ethylene thiourea | 1.5 | — | — |
| TMDHCH (Mp. approx. 70° C.) | — | 2 | — |
| Tetramethyl thiuram monosulphide | — | — | 1 |
| o-tolyl biguanide | — | — | 1 |
| Sulphur | — | — | 0.5 |
| Zinc oxide | 5 | 5 | 5 |

| Mooney scorch time 120° C.: | | | |
|---|---|---|---|
| MS5 (mins.) | 9.8 | 12.0 | 43.0 |

| Vulkameter 150° C. (running 40 mins.): | | | |
|---|---|---|---|
| Maximum shear modulus (N) | 42.4 | 39.5 | 31.2 |
| $T_{10}$ (mins.) | 2.7 | 3.5 | 6.4 |
| $T_{80}$ (mins.) | 15.2 | 24.7 | 25.4 |

I claim:

1. A process for crosslinking polychloroprene by adding crosslinking agents, characterised in that the crosslinking agents used are compounds corresponding to the formulae:

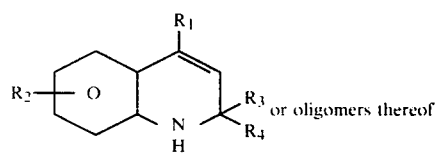

(1) or oligomers thereof

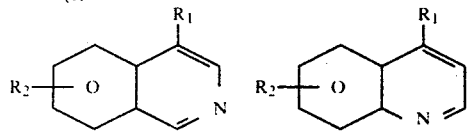

(2)   (2a)

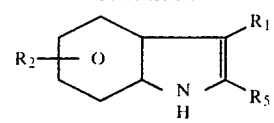

(3)

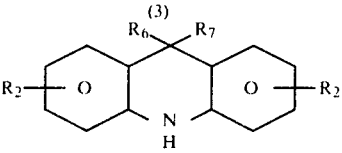

(4)

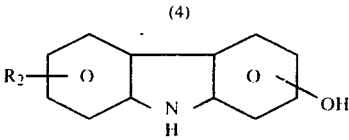

(5)

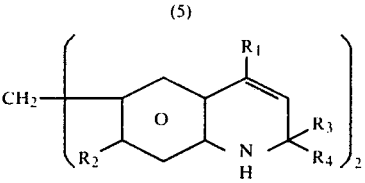

(6)

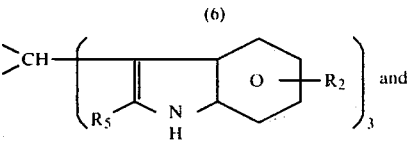

(7)

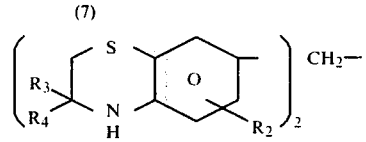

(8)

wherein
$R_1$ represents hydrogen or $C_1$-$C_4$ alkyl;
$R_2$ represents hydrogen $C_1$-$C_{14}$ alkyl, $C_1$-$C_{14}$ alkoxy, $C_1$-$C_{14}$ alkyl phenyl, phenyl, naphthyl, hydroxyl or $C_1$-$C_{14}$ alkyl hydroxyl;
$R_3$ and $R_4$, which may be the same or different, each represents hydrogen or $C_1$-$C_4$ alkyl;
$R_5$ represents hydrogen or $C_1$-$C_4$ alkyl; and
$R_6$ and $R_7$ which may be the same or different, each represents hydrogen or $C_1$-$C_4$ alkyl;
and in that crosslinking is carried out in the conventional way.

2. A process as claimed in claim 1, characterised in that the crosslinking agent is used in quantities of from 0.1 to 15 parts, by weight, per 100 parts, by weight, of solid rubber.

3. A process as claimed in claim 1 characterised in that the crosslinking agent is used in quantities of from 0.3 to 3 parts, by weight, per 100 parts, by weight, of solid rubber.

4. A process as claimed in claim 1 characterised in that crosslinking is carried out at a temperature of from 5° to 270° C.

5. A process as claimed in claim 1 characterised in that crosslinking is carried out at a temperature of from 40° to 200° C.

6. Crosslinked polychloroprene obtained by the process claimed in claim 1.

* * * * *